United States Patent
Seong

(10) Patent No.: US 9,768,419 B2
(45) Date of Patent: Sep. 19, 2017

(54) CURVED SECONDARY BATTERY AND METHOD OF MANUFACTURING THE SAME

(71) Applicant: SAMSUNG SDI CO., LTD., Yongin-si, Gyeonggi-do (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 196 days.

(21) Appl. No.: 14/593,983

(22) Filed: Jan. 9, 2015

(65) Prior Publication Data

US 2015/0221900 A1 Aug. 6, 2015

(30) Foreign Application Priority Data

Feb. 5, 2014 (KR) .................. 10-2014-0013313

(51) Int. Cl.
| | |
|---|---|
| *H01M 2/02* | (2006.01) |
| *H01M 2/08* | (2006.01) |
| *H01M 10/04* | (2006.01) |
| *H01M 10/44* | (2006.01) |

(52) U.S. Cl.
CPC ....... *H01M 2/0207* (2013.01); *H01M 2/0202* (2013.01); *H01M 2/0275* (2013.01); *H01M 2/0287* (2013.01); *H01M 2/08* (2013.01); *H01M 10/0431* (2013.01); *H01M 10/446* (2013.01); *H01M 10/0436* (2013.01); *H01M 2220/30* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 2006/0216585 A1* | 9/2006 | Lee ............... | H01M 2/0257 429/162 |
| 2009/0023058 A1* | 1/2009 | Kim ............... | H01M 2/0207 429/131 |
| 2011/0097615 A1* | 4/2011 | Goh ............... | H01M 2/0275 429/94 |
| 2012/0183825 A1 | 7/2012 | Lee et al. | |

FOREIGN PATENT DOCUMENTS

| | | |
|---|---|---|
| KR | 10-2003-0084153 A | 11/2003 |
| KR | 10-2010-0097820 A | 9/2010 |
| KR | 10-2012-0082808 A | 7/2012 |

OTHER PUBLICATIONS

Rosato et al. (Reinforced Plastics Handbook 2004).*

* cited by examiner

*Primary Examiner* — Sarah A Slifka
*Assistant Examiner* — Wojciech Haske
(74) *Attorney, Agent, or Firm* — Lewis Roca Rothgerber Christie LLP

(57) ABSTRACT

A curved secondary battery includes an electrode assembly; a first sealing sheet at a first surface of the electrode assembly; a second sealing sheet at a second surface of the electrode assembly, the first sealing sheet and the second sealing sheet together sealing the electrode assembly; and a reinforcing layer on the first sealing sheet, wherein the first sealing sheet has a concavely curved surface, and wherein the reinforcing layer has a curvature corresponding to a curvature of the first sealing sheet.

15 Claims, 4 Drawing Sheets

CURVED SECONDARY BATTERY AND METHOD OF MANUFACTURING THE SAME

CROSS-REFERENCE TO RELATED APPLICATION

This application claims priority to and the benefit of Korean Patent Application No. 10-2014-0013313, filed on Feb. 5, 2014 in the Korean Intellectual Property Office, the disclosure of which is incorporated herein in its entirety by reference.

BACKGROUND

1. Field

One or more embodiments of the present invention are related to curved secondary batteries and methods of manufacturing curved secondary batteries.

2. Description of the Related Art

Secondary batteries are designed to be recharged unlike primary batteries that are not designed to be recharged. Because the secondary batteries are economical and environmentally friendly, their use is increasingly popular. Recently, the kinds of electronic devices using secondary batteries have been diversified, and designs of electronic devices have become an important factor in determining the purchase of electronic devices.

For example, various wearable computers using secondary batteries as a power supply source and applications thereof have been developed and manufactured. Also, electronic devices, such as mobile phones and laptop computers, have been designed to have curved surfaces for ergonomic purposes. Thus, secondary batteries for operating such electronic devices may also have curved surfaces according to the shapes of the electronic devices and may maintain shapes thereof even after they are repeatedly charged and discharged.

SUMMARY

One or more embodiments of the present invention are related to curved secondary batteries and methods of manufacturing curved secondary batteries.

Additional aspects will be set forth in part in the description which follows and, in part, will be apparent from the description or may be learned by practice of the presented embodiments.

According to one embodiment of the present invention, a secondary battery includes: an electrode assembly; a first sealing sheet at a first surface of the electrode assembly; a second sealing sheet at a second surface of the electrode assembly, the first sealing sheet and the second sealing sheet together sealing the electrode assembly; and a reinforcing layer on the first sealing sheet, wherein the first sealing sheet has a concavely curved surface, and wherein the reinforcing layer has a curvature corresponding to a curvature of the first sealing sheet.

The secondary battery may further include a bonding layer coupling the reinforcing layer to the first sealing sheet.

A bending strength of the reinforcing layer may be greater than a volume expansion force generated when the electrode assembly is charged such that the secondary battery maintains its shape.

The reinforcing layer may further include a wing portion at at least one side thereof, and wherein the wing portion is bent and coupled to a side surface of the electrode assembly and an edge of the second sealing sheet extending in a width direction of the electrode assembly.

One side of the first sealing sheet and one side of the second sealing sheet may be integrally formed, and an edge of the first sealing sheet and an edge of the second sealing sheet may be bonded to each other at a sealing portion.

The first sealing sheet and the second sealing sheet are integrally formed at the side of the electrode assembly onto which the wing portion is coupled.

The electrode assembly may include a first electrode plate, a second electrode plate, and a separator between the first electrode plate and the second electrode plate, wherein the first electrode plate, the second electrode plate, and the separator are wound about a winding axis, and wherein the winding axis is curved.

A first electrode tab and a second electrode tab may be respectively coupled to the first electrode plate and the second electrode plate, and the first electrode tab and the second electrode tab each protrude outside the first and second sealing sheets at the sealing portion, wherein the reinforcing layer may further includes another wing portion that is coupled to another side surface of the electrode assembly between the first electrode tab and the second electrode tab and coupled to another edge of the second sealing sheet, and wherein the other side surface is opposite to the side surface.

The reinforcing layer may include polypropylene (PP), polyethylene terephthalate (PET), polyimide (PI), or polyphenylene sulfide (PPS).

According to another embodiment of the present invention, a secondary battery includes an electrode assembly having a concavely curved first surface and a convexly curved second surface opposite to the first surface; a first sealing sheet on the first surface of the electrode assembly; a second sealing sheet on the second surface of the electrode assembly, the first sealing sheet and the second sealing sheet together sealing the electrode assembly; and a reinforcing layer on the first sealing sheet, wherein a bending strength of the reinforcing layer is greater than a volume expansion force generated when the electrode assembly is charged such that the secondary battery maintains its shape.

The reinforcing layer may include a curved plate, wherein the curvature of the curved plate may correspond to a curvature of the first surface, and wherein the curved plate may be coupled to the first sealing sheet by a bonding layer.

The reinforcing layer may further include a wing portion at at least one side thereof, and wherein the wing portion is bent and coupled to at least one side surface of the electrode assembly and an edge of the second sealing sheet extending in a width direction of the electrode assembly.

The reinforcing layer may include polypropylene (PP), polyethylene terephthalate (PET), polyimide (PI), or polyphenylene sulfide (PPS).

The electrode assembly may include a first electrode plate, a second electrode plate, and a separator between the first electrode plate and the second electrode plate, wherein the first electrode plate, the second electrode plate, and the separator may be wound about a winding axis, and wherein the winding axis may be curved.

According to yet another embodiment of the present invention, a method of manufacturing a secondary battery includes: preparing a flat secondary battery including an electrode assembly and a pouch sealing the electrode assembly; mounting the flat secondary battery in a jig, pressing the flat secondary battery to form a curved secondary battery;

attaching a reinforcing layer onto a concave surface of the curved secondary battery; and performing an initial charge and discharge cycle.

A bending strength of the reinforcing layer may be greater than a volume expansion force generated when the electrode assembly is charged such that the secondary battery maintains its shape.

The reinforcing layer may include a curved plate and may be coupled to the concave surface by a bonding layer.

The reinforcing layer may further include a wing portion at at least one side thereof, and wherein the wing portion is bent and coupled to at least one side surface of the electrode assembly and an edge of a convex surface of the curved secondary battery extending in a width direction of the curved secondary battery.

The reinforcing layer may include polypropylene (PP), polyethylene terephthalate (PET), polyimide (PI), or polyphenylene sulfide (PPS).

During at least one of the mounting of the flat secondary battery and the pressing of the flat secondary battery, the jig may heat only one surface of the flat secondary battery, wherein the one surface of the flat secondary battery is formed to be a convex surface that is opposite to the concave surface of the curved secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
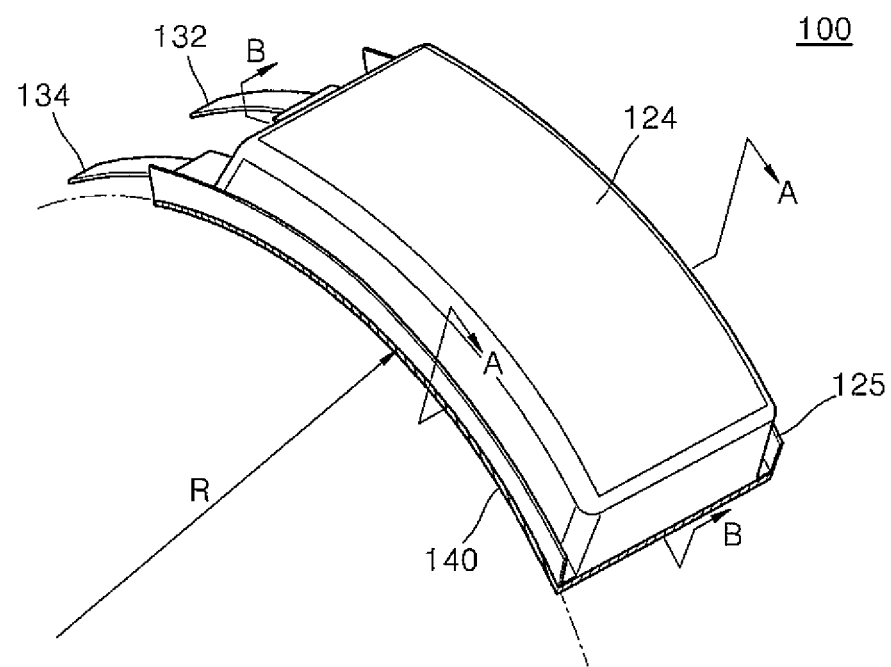
FIG. 1 is a schematic perspective view of a curved secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The present invention may include various embodiments and modifications, and example embodiments are illustrated in the drawings and will be described below in detail. However, it will be understood that the present invention is not limited to these example embodiments and includes all modifications, equivalents, and substitutions falling within the spirit and scope of the present invention. Like reference numerals or symbols denote like elements throughout the specification and drawings.

Although terms such as "first" and "second" may be used herein to describe various elements or components, these elements or components should not be limited by these terms. These terms are only used to distinguish one element or component from another element or component. Further, the use of "may" when describing embodiments of the present invention refers to "one or more embodiments of the present invention."

The terms used herein are for the purpose of describing example embodiments only and are not intended to be limiting of the present invention. It will be understood that terms such as "comprise", "include", and "have", when used herein, specify the presence of stated features, integers, steps, operations, elements, components, or combinations thereof, but do not preclude the presence or addition of one or more additional features, integers, steps, operations, elements, components, or combinations thereof.

Hereinafter, embodiments of the present invention will be described in detail with reference to the accompanying drawings.

Figure 2:
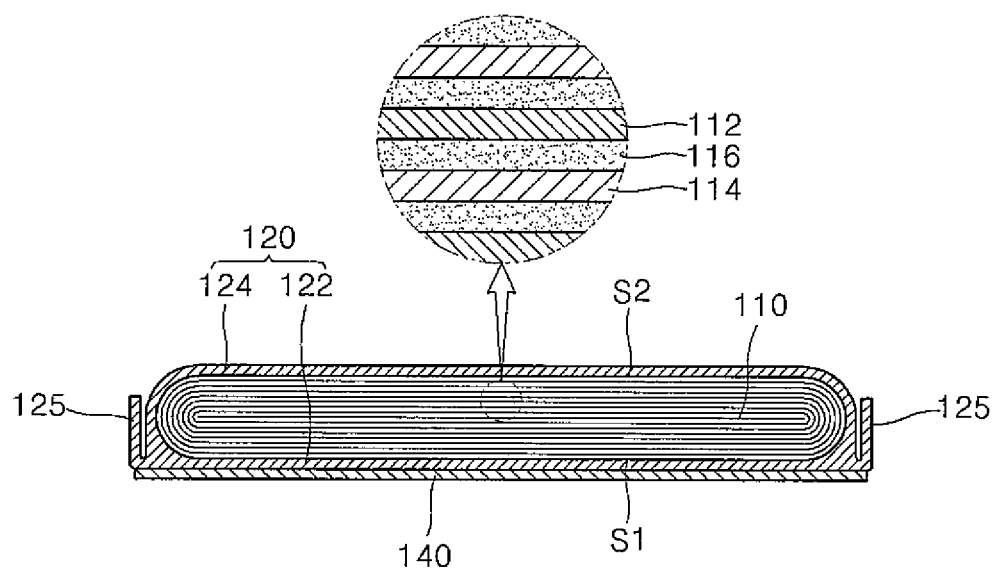
FIG. 2 is a schematic cross-sectional view taken along a line A-A of FIG. 1.
Figure 3:
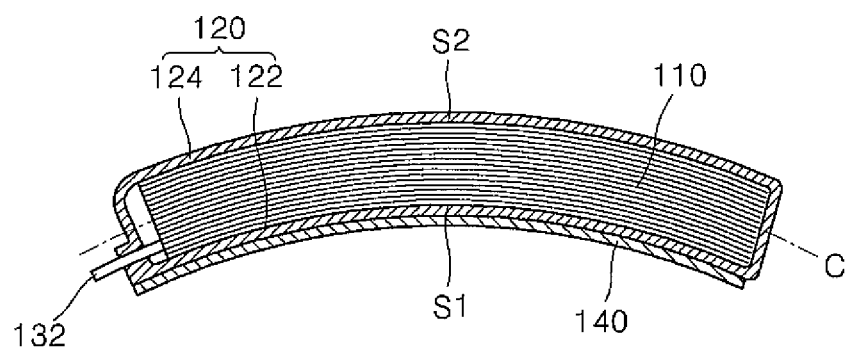
FIG. 3 is a schematic cross-sectional view taken along a line B-B of FIG. 1.

FIG. 1 is a schematic perspective view of a curved secondary battery 100 according to an embodiment of the present invention. FIG. 2 is a schematic cross-sectional view taken along a line A-A of FIG. 1. FIG. 3 is a schematic cross-sectional view taken along a line B-B of FIG. 1.

Referring to FIGS. 1 through 3, the curved secondary battery 100 according to an embodiment of the present invention may have a curved shape having a curvature radius R. In other words, the curved secondary battery 100 may have a curved surface (e.g., may be one or more curved surfaces) according to a shape of an electronic device to which the curved secondary battery 100 is installed. Accordingly, a gap between the electronic device and the curved secondary battery 100 can be prevented. Therefore, an internal space of the electronic device may be efficiently used, and the curved secondary battery 100 may be prevented from being damaged due to the movement of the curved secondary battery 100 within the electronic device.

The curved secondary battery 100 may include an electrode assembly 110, a pouch 120 including a first sealing sheet 122 and a second sealing sheet 124 that seal the electrode assembly 110, and a reinforcing layer 140 (e.g., a reinforcing sheet) on (e.g., attached on) the first sealing sheet 122.

The electrode assembly 110 may include a first electrode plate 112, a second electrode plate 114, and a separator 116 between the first electrode plate 112 and the second electrode plate 114. For example, the electrode assembly 110 may have a jelly roll structure formed by sequentially stacking and winding the first electrode plate 112, the separator 116, and the second electrode plate 114 with respect to (e.g., about) a winding axis C.

The electrode assembly 110 may be curved along a length direction thereof so that the winding axis C may have a curved shape. Thus, the electrode assembly 110 may include a concavely curved first surface S1 and a convexly curved second surface S2 that is opposite to the first surface S1 (e.g., a concavely curved surface of the first surface S1 may face away from the electrode assembly 110, and a convexly curved surface of the second surface S2 may face away from the electrode assembly 110).

The first electrode plate 112 may be a positive electrode film or a negative electrode film. When the first electrode plate 112 is the positive electrode film, the second electrode plate 114 may be the negative electrode film. When the first electrode plate 112 is the negative electrode film, the second electrode plate 114 may be the positive electrode film. That is, the first electrode plate 112 and the second electrode plate 114 may have electrically different polarities and are not limited to specific polarities. However, for convenience of explanation, the first electrode plate 112 is the positive electrode film and the second electrode plate 114 is the negative electrode film.

The first electrode plate 112 may include a first active material portion coated with a first active material and a first uncoated portion that is not coated with the first active material. The first active material portion may be formed by coating a portion of at least one surface of, for example, an aluminum plate with the first active material, and the first uncoated portion may be the other portion of the aluminum plate that is not coated with the first active material. The first active material may be a positive electrode active material such as a lithium-containing transition metal oxide (such as $LiCoO_2$, $LiNiO_2$, $LiMnO_2$, or $LiMnO_4$) or a lithium chalcogenide compound.

The second electrode plate 114 may include a second active material portion coated with a second active material and a second uncoated portion that is not coated with the second active material. The second active material portion may be formed by coating a portion of at least one surface of, for example, a copper plate with the second active material, and the second uncoated portion may be the other portion of the copper plate that is not coated with the second active material. The second active material may be, for example, a negative electrode active material, for example a carbon material (such as crystalline carbon, amorphous carbon, a carbon complex, or carbon fiber), a lithium metal, or a lithium alloy.

The separator 116 may be a porous polymer layer, such as a polyethylene (PE) layer, a polypropylene (PP) layer, etc., may be woven or non-woven including polymer fiber, may include ceramic particles, and may be formed of a polymer solid electrolyte. The separator 116 may be formed as an independent film or may be used as a non-conductive porous layer formed on the first electrode plate 112 or the second electrode plate 114. Because the separator 116 may be formed to electrically separate (e.g., electrically insulate) the first electrode plate 112 and the second electrode plate 114 from each other, the separator 116 may not be necessarily formed in the same shape as a shape of the first electrode plate 112 or the second electrode plate 114.

A first electrode tab 132 and a second electrode tab 134 may be provided to electrically couple the electrode assembly 110 to the outside of the secondary battery 100 (e.g., to electrically couple the electrode assembly 110 to an external device). The first electrode tab 132 may be electrically coupled to (e.g., electrically connected to) the first electrode plate 112, and the second electrode tab 134 may be electrically coupled to the second electrode plate 114. For example, the first electrode tab 132 may be coupled to the first uncoated portion by welding, and the second electrode tab 134 may be coupled to the second uncoated portion by welding.

The pouch 120 may seal the electrode assembly 110 and accommodate (e.g., receive) an electrolyte together with the electrode assembly 110 therein. The pouch 120 may include the first sealing sheet 122 corresponding to (e.g., provided on) the first surface S1 of the electrode assembly 110 and the second sealing sheet 124 provided on (e.g., corresponding to) the second surface S2 of the electrode assembly 110. The second sealing sheet 124 and the first sealing sheet 122 together seal the electrode assembly 110.

The first sealing sheet 122 and the second sealing sheet 124 may have a three-layered structure including an insulating layer, a metal layer, and an insulating layer. For example, the metal layer may be formed of aluminum, steel, or stainless steel, and the insulating layer may be formed of cast polypropylene (CPP), polyethylene terephthalate (PET), or nylon; however, embodiments of the present invention are not limited thereto.

One side of the first sealing sheet 122 and one side of the second sealing sheet 124 may be continuously formed (e.g., one side or layer of each of the first sealing sheet 122 and the second sealing sheet 124 may be integrally formed). For example, a receiving space configured to receive (or accommodate) the electrode assembly 110 may be formed by (e.g., partially formed by) the second sealing sheet 124. When the electrode assembly 110 is received in the receiving space, the first sealing sheet 122 having one side formed continuously with the second sealing sheet 124 is folded on the second sealing sheet 124, and then edges of the first sealing sheet 122 and the second sealing sheet 124 are adhered to each other. Accordingly, the electrode assembly 110 may be sealed, and sealing portions 125 may be formed at the edges at which the first sealing sheet 122 and the second sealing sheet 124 are bonded (e.g., the sealing portions 125 may be formed at respective edges along the width direction of the electrode assembly 110). The sealing portions 125 provided on respective side surfaces of the curved secondary battery 100 may be bent to correspond to (e.g. parallel with) side surfaces of the curved secondary battery 100.

The reinforcing layer 140 may be provided on the first sealing sheet 122 to prevent a shape of the curved secondary battery 100 from being significantly changed.

The curvature radius R of the curved secondary battery 100 may change due to contraction and expansion of the first electrode plate 112 and the second electrode plate 114 when the curved secondary battery 100 is charged and discharged. For example, a concavely curved surface of the curved secondary battery 100 (e.g., the first surface S1) is subjected to contraction stress when the curved secondary battery 100 is manufactured, and thus, the resulting contraction stress may tend to be relaxed by expanding the concavely curved surface when the curved secondary battery 100 is charged (e.g., the concavely curved surface may tend to relax or become less concave due to the repeated charging and discharging of the curved secondary battery 100). In this regard, when the reinforcing layer 140 has the same shape as a shape of the first surface S1 and is provided on the first sealing sheet 122, the shape of the curved secondary battery 100 may be maintained by reducing or preventing expansion of the concavely curved surface when the curved secondary battery 100 is charged and discharged.

To this end, the reinforcing layer 140 should have a bending strength greater than a volume expansion (e.g., a volume expansion force) generated when the curved secondary battery 100 is charged. For example, the reinforcing layer 140 may have bending strength equal to or greater than about 0.3 $Kgf/cm^2$. The reinforcing layer 140 should be rigid enough to prevent or reduce the volume of the curved secondary battery 100 from increasing. The reinforcing layer 140 may be formed of, for example, polypropylene (PP), polyethylene terephthalate (PET), polyimide (PI), or polyphenylene sulfide (PPS) having excellent mechanical strength, but the present invention is not limited thereto.

The reinforcing layer 140 may be a curved plate that has the same shape as a shape of the first surface S1, and the reinforcing layer 140 may be coupled to (e.g., attached onto) the first sealing sheet 122 by a bonding layer. Thus, although the reinforcing layer 140 is formed on the concave surface of the curved secondary battery 100, the reinforcing layer 140 may have a uniform thickness.

Figure 4:
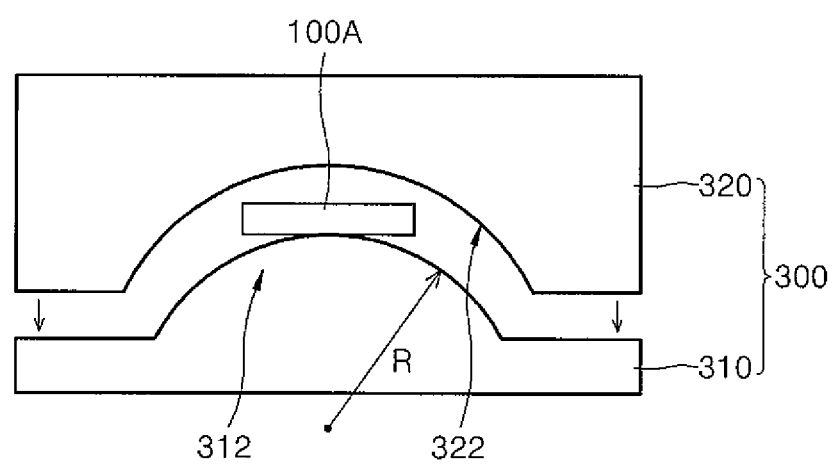
FIG. 4 is a schematic cross-sectional view of a step of manufacturing the curved secondary battery shown in FIG. 1 according to an embodiment of the present invention.
Figure 5:
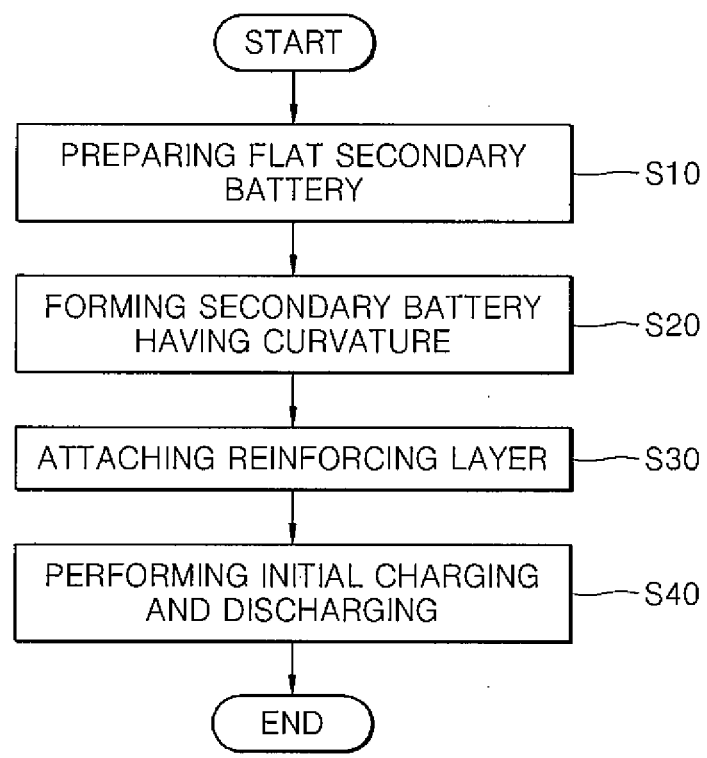
FIG. 5 is a flowchart illustrating a method of manufacturing the curved secondary battery shown in FIG. 1 according to an embodiment of the present invention.

FIG. 4 is a schematic cross-sectional view of the curved secondary battery 100 shown in FIG. 1 according to an embodiment of the present invention. FIG. 5 is a flowchart illustrating a method of manufacturing the curved secondary battery 100 shown in FIG. 1 according to an embodiment of the present invention. The method of manufacturing the curved secondary battery 100 will now be described in brief with reference to FIGS. 1 through 5 below.

The method of manufacturing the curved secondary battery 100 according to an embodiment of the present invention may include an operation S10 including preparing a flat secondary battery 100A, an operation S20 including mounting the flat secondary battery 100A in a jig 300 and pressing the flat secondary battery 100A to form a curved secondary battery, an operation S30 including attaching the reinforcing layer 140 onto a concave surface of the curved secondary battery, and an operation S40 including performing initial charging and discharging.

The operation S10 including preparing the flat secondary battery 100A corresponds to an operation of manufacturing the flat secondary battery 100A that has the same or substantially the same structure or configuration as that of the curved secondary battery 100 described with reference to FIGS. 1 through 3 but is not curved.

The jig 300 may include a lower jig 310 and an upper jig 320 that are separate from each other. The jig 300 may be formed of a material such as a metal.

One of the lower jig 310 and the upper jig 320 may include a convex portion 312 (e.g., a convex surface) having the curvature radius R. Also, the other of the first lower jig 310 and the upper jig 320 may include a concave portion 322 (e.g., a concave surface) corresponding to the convex portion 312, and the concave portion 322 may have a curvature radius that is greater than the curvature radius R that is to be provided to (e.g., imparted to) the flat secondary battery 100A. FIG. 4 illustrates an example embodiment in which the convex portion 312 is formed in the lower jig 310 and the concave portion 322 is formed in the upper jig 320; however, embodiments of the present invention are not limited thereto. For example, the convex portion 312 may be formed in the upper jig 320 and the concave portion 322 may be formed in the lower jig 310.

When the flat secondary battery 100A is mounted in the jig 300, the jig 300 presses the flat secondary battery 100A. In this regard, a buffer member may be attached to each of the convex portion 312 and the concave portion 322. The buffer member may prevent a part, for example, an edge portion, of the flat secondary battery 100A from being squashed or crushed during the pressing operation.

When the flat secondary battery 100A is pressed, at least a concave portion 322 heats the flat secondary battery 100A. In other words, when the flat secondary battery 100A is pressed and shaped, the flat secondary battery 100A is formed to have a convex surface and a concave surface, and the jig 300 heats only the convex surface. For example, the concave portion 322 may heat the flat secondary battery 100A to be in a range of about 50° C. to about 80° C.

The convex surface of the secondary battery 100A contacts the concave portion 322 and receives an expansion stress, and the concave surface of the secondary battery 100A that is opposite to the convex surface receives a contraction stress. Therefore, the expansion stress applied to the second sealing sheet 124 and the second surface S2 of the secondary battery 100 may be reduced by heating the convex surface, and the contraction stress may be applied to the concave surface and the first surface S1 of the secondary battery 100 without heating the concave surface of the secondary battery 100A. Thus, a wrinkle may be effectively prevented from being generated in the first sealing sheet 122.

After the pressing operation, the curved secondary battery is dismounted from the jig 300 and the reinforcing layer 140 is attached onto the first sealing sheet 122.

The reinforcing layer 140 may be a plate that has the same shape as a shape of the first surface S1, and the reinforcing layer 140 may be formed of polypropylene (PP), polyethylene terephthalate (PET), polyimide (PI), or polyphenylene sulfide (PPS). The reinforcing layer 140 may be attached onto the first sealing sheet 122 by a bonding layer.

The reinforcing layer 140 may be prepared to have the same shape as a shape of the first surface S1 in advance and be attached onto the first sealing sheet 122 by the bonding layer. Thus, the reinforcing layer 140 may be formed on the concavely curved first surface S1 to have a uniform thickness.

When the reinforcing layer 140 is formed by coating and hardening resin on the first sealing sheet 122, the resin flows according to the shape of the first surface S1 (e.g., according to the curved shape of the first surface S1), and thus, the reinforcing layer 140 may have an irregular thickness. As such, when the reinforcing layer 140 has an irregular thickness rigidity of the reinforcing layer 140 may vary therein (e.g., may be partially different), and a shape of the curved secondary battery 100 may not be adequately prevented from changing.

After the reinforcing layer 140 is attached to the secondary battery 100, the curved secondary battery 100 may be initially charged and discharged (e.g., an initial charge/discharge cycle may be performed). When the curved secondary battery 100 is initially charged and discharged, gas may be generated in the curved secondary battery 100, and thus, the curved secondary battery 100 may expand. Accordingly, charging may be slowly performed to reduce the generation of gas.

According to the embodiments of the present invention, the reinforcing layer 140 may be attached onto the first sealing sheet 122, the reinforcing layer 140 has a bending strength greater than a volume expansion generated when the curved secondary battery 100 is charged, and is rigid enough to reduce or prevent the volume of the curved secondary battery 100 from increasing. Thus, although initial charging and discharging are performed, the curvature R of the curved secondary battery 100 may not significantly change, and although charging and discharging are repeatedly performed, the shape of the curved secondary battery 100 may be maintained.

Figure 6:
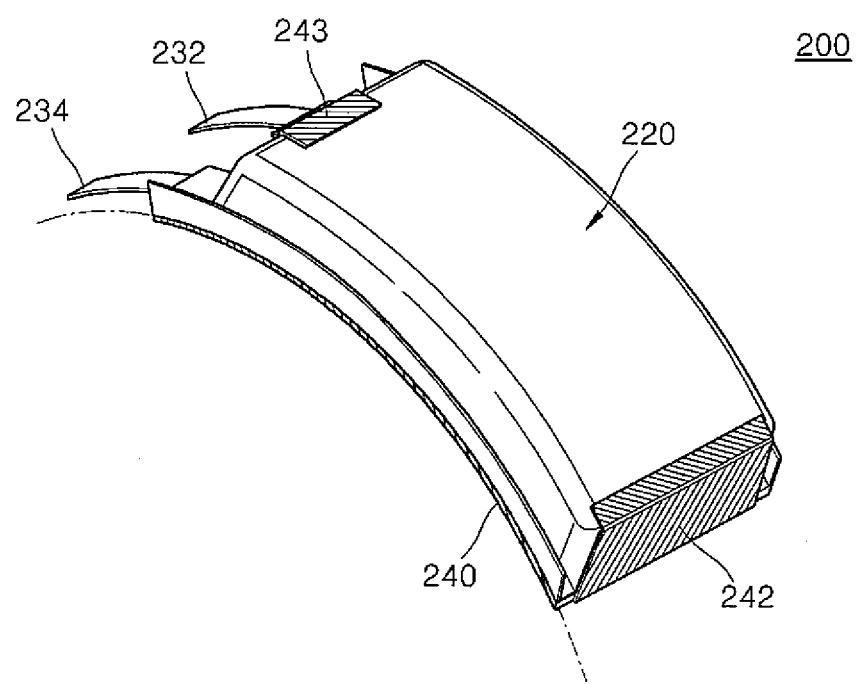
FIG. 6 is a schematic perspective view of a curved secondary battery according to another embodiment of the present invention.

FIG. 6 is a schematic perspective view of a curved secondary battery 200 according to another embodiment of the present invention.

Referring to FIG. 6, the curved secondary battery 200 may have a curved shaped along a uniform curvature radius. A reinforcing layer 240 may be attached onto a concave surface of the curved secondary battery 200.

The curved secondary battery 200 may include an electrode assembly and a pouch 220 sealing the electrode assembly. A first electrode tab 232 and a second electrode tab 234 may be electrically coupled to the electrode assembly and may be exposed outside the pouch 220.

The reinforcing layer 240 may be attached onto the concave surface of the curved secondary battery 200 to prevent or reduce a curvature of the curved secondary battery 200 from changing when the curved secondary battery 200 is charged and discharged. The reinforcing layer 240 may be a plate having the same shape as a shape of the concave surface of the curved secondary battery 200 and may be attached to the secondary battery 200 by a bonding layer.

The reinforcing layer 240 may further include a wing portion 242 at at least one side (or one edge) thereof. The wing portion 242 may be integrally formed with the reinforcing layer 240 and may be attached to at least one side surface and edge of a convex surface of the curved secondary battery 200 in (e.g., extending in) a width direction of the curved secondary battery 200 (e.g., an edge of the convex surface along a length direction of the curved secondary battery 200).

For example, the wing portion 242 may extend from the reinforcing layer 240 in the length direction of the curved secondary battery 200 and may be bent to be attached to one side surface of the secondary battery 200 and to an edge of the convex surface of the curved secondary battery 200. The one side surface of the curved secondary battery 200 onto which the wing portion 242 is attached is a portion where the first sealing sheet and the second sealing sheet are continuously formed.

Another wing portion 243 may extend and may be bent from the reinforcing layer 240 and may be attached to another side surface of the curved secondary battery 200 from which the first electrode tab 232 and the second electrode tab 234 protrude. The another wing portion 243 may be attached onto another side surface between the first electrode tab 232 and the second electrode tab 234 that protrude from the curved secondary battery 200 and attached onto other edge of the convex surface of the curved secondary battery 200.

Therefore, the reinforcing layer 240 may be more firmly attached to the concave surface of the curved secondary battery 200.

As described above, according to the one or more of the above embodiments of the present invention, although curved secondary batteries are repeatedly charged and discharged, shapes of the curved secondary batteries may be maintained.

It should be understood that the example embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A secondary battery comprising:
   an electrode assembly;
   a first sealing sheet at a first surface of the electrode assembly, the first sealing sheet comprising an insulating layer, a metal layer, and another insulating layer;
   a second sealing sheet at a second surface of the electrode assembly, the first sealing sheet and the second sealing sheet together sealing the electrode assembly;
   a plurality of electrode tabs electrically connected to the electrode assembly and protruding from the first and second sealing sheets; and
   a reinforcing layer comprising a base portion and a wing portion bent from the base portion, the base portion being on the first sealing sheet and the wing portion being on a side surface of the electrode assembly and between the electrode tabs,
   wherein the first sealing sheet has a concavely curved surface, and
   wherein the reinforcing layer has a curvature corresponding to a curvature of the first sealing sheet.

2. The secondary battery of claim 1 further comprising a bonding layer coupling the reinforcing layer to the first sealing sheet.

3. The secondary battery of claim 1, wherein a bending strength of the reinforcing layer is greater than a volume expansion force generated when the electrode assembly is charged such that the secondary battery maintains its shape.

4. The secondary battery of claim 1,
   wherein the wing portion is bent and coupled to an edge of the second sealing sheet extending in a width direction of the electrode assembly.

5. The secondary battery of claim 4, wherein one side of the first sealing sheet and one side of the second sealing sheet are integrally formed, and an edge of the first sealing sheet and an edge of the second sealing sheet are bonded to each other at a sealing portion.

6. The secondary battery of claim 5, wherein the reinforcing layer further comprises a second wing portion bent from the base portion, and
   wherein the first sealing sheet and the second sealing sheet are integrally formed at the side surface of the electrode assembly onto which the second wing portion is coupled.

7. The secondary battery of claim 5, wherein the electrode assembly comprises a first electrode plate, a second electrode plate, and a separator between the first electrode plate and the second electrode plate,
   wherein the first electrode plate, the second electrode plate, and the separator are wound about a winding axis, and
   wherein the winding axis is curved.

8. The secondary battery of claim 1, wherein the reinforcing layer comprises polypropylene (PP), polyethylene terephthalate (PET), polyimide (PI), or polyphenylene sulfide (PPS).

9. The secondary battery of claim 1, wherein the second sealing sheet comprises the insulating layer, the metal layer, and the other insulating layer.

10. A secondary battery comprising:
    an electrode assembly comprising a first electrode plate, a second electrode plate, and a separator between the first electrode plate and the second electrode plate, the first electrode plate, the second electrode plate, and the separator being wound about a curved winding axis;
    a first sealing sheet at a first surface of the electrode assembly, the first sealing sheet having a concavely curved surface;
    a second sealing sheet at a second surface of the electrode assembly, the first sealing sheet and the second sealing sheet together sealing the electrode assembly; and
    a reinforcing layer on the first sealing sheet and having a curvature corresponding to a curvature of the first sealing sheet, the reinforcing layer comprising a wing portion at at least one side of the reinforcing layer, the wing portion being bent and coupled to a side surface of the electrode assembly and an edge of the second sealing sheet extending in a width direction of the electrode assembly, wherein one side of the first sealing sheet and one side of the second sealing sheet are integrally formed, and an edge of the first sealing sheet and an edge of the second sealing sheet are bonded to each other at a sealing portion, wherein a first electrode tab and a second electrode tab are respectively coupled to the first electrode plate and the second electrode plate, and the first electrode tab and the second electrode tab each protrude outside the first and second sealing sheets at the sealing portion, wherein the reinforcing layer further comprises another wing portion that is coupled to another side surface of the electrode assembly between the first electrode tab and the second electrode tab and coupled to another edge of second sealing sheet, and wherein the other side surface is opposite to the side surface.

11. A secondary battery comprising:
an electrode assembly having a concavely curved first surface, a convexly curved second surface opposite to the first surface, and a side surface extending between first and second surfaces, the electrode assembly having a length in a first direction and a width in a second direction perpendicular to the first direction;
a sealing sheet surrounding and sealing the electrode assembly, the sealing sheet comprising an insulating layer, a metal layer, and another insulating layer; and
a reinforcing layer on the sealing sheet and comprising a base portion and a wing portion extending from the base portion, the base portion being on the first surface of the electrode assembly and having a curvature corresponding to the first surface, a first portion of the wing portion being on the side surface and a second portion of the wing portion being on the second surface of the electrode assembly, the second portion of the wing portion having a smaller length in the first direction than the length of the electrode assembly,
wherein a bending strength of the reinforcing layer is greater than a volume expansion force generated when the electrode assembly is charged such that the secondary battery maintains its shape.

12. The secondary battery of claim 11, wherein the base portion of the reinforcing layer comprises a curved plate, and wherein the curved plate is coupled to the sealing sheet by a bonding layer.

13. The secondary battery of claim 11,
wherein the wing portion is bent from the base portion at least twice.

14. The secondary battery of claim 11, wherein the reinforcing layer comprises polypropylene (PP), polyethylene terephthalate (PET), polyimide (PI), or polyphenylene sulfide (PPS).

15. The secondary battery of claim 11, wherein the electrode assembly comprises a first electrode plate, a second electrode plate, and a separator between the first electrode plate and the second electrode plate,
wherein the first electrode plate, the second electrode plate, and the separator are wound about a winding axis, and
wherein the winding axis is curved.

* * * * *